United States Patent
Watanabe et al.

(10) Patent No.: US 10,218,141 B2
(45) Date of Patent: Feb. 26, 2019

(54) MODULATION PATTERN CALCULATION DEVICE, LIGHT CONTROL DEVICE, MODULATION PATTERN CALCULATION METHOD, MODULATION PATTERN CALCULATION PROGRAM, AND STORAGE MEDIUM

(71) Applicant: HAMAMATSU PHOTONICS K.K., Hamamatsu-shi, Shizuoka (JP)

(72) Inventors: Koyo Watanabe, Hamamatsu (JP); Takashi Inoue, Hamamatsu (JP); Koji Takahashi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/573,935

(22) PCT Filed: May 11, 2016

(86) PCT No.: PCT/JP2016/064041
§ 371 (c)(1),
(2) Date: Nov. 14, 2017

(87) PCT Pub. No.: WO2016/185979
PCT Pub. Date: Nov. 24, 2016

(65) Prior Publication Data
US 2018/0294615 A1    Oct. 11, 2018

(30) Foreign Application Priority Data

May 15, 2015  (JP) .................................. 2015-100087

(51) Int. Cl.
*G02F 1/01* (2006.01)
*H01S 3/00* (2006.01)
(Continued)

(52) U.S. Cl.
CPC .......... *H01S 3/0085* (2013.01); *G02F 1/0121* (2013.01); *G05B 15/02* (2013.01); *G06F 17/14* (2013.01); *G02F 2203/12* (2013.01)

(58) Field of Classification Search
CPC ........................... G02F 1/0121; G02F 2203/12
See application file for complete search history.

(56) References Cited

U.S. PATENT DOCUMENTS

2006/0043184 A1    3/2006  Fukuchi et al.
2007/0019282 A1    1/2007  Weiner et al.
(Continued)

FOREIGN PATENT DOCUMENTS

| EP | 1 662 296 A1 | 5/2006 |
| JP | 2013-186350 A | 9/2013 |
| WO | WO-2014/136784 A1 | 9/2014 |

OTHER PUBLICATIONS

International Preliminary Report on Patentability dated Nov. 30, 2017 for PCT/JP2016/064041.
(Continued)

*Primary Examiner* — Joseph P Martinez
(74) *Attorney, Agent, or Firm* — Drinker Biddle & Reath LLP

(57) ABSTRACT

An iterative Fourier transform unit in a modulation pattern calculation apparatus performs a Fourier transform on a waveform function including an intensity spectrum function and a phase spectrum function, performs a replacement of a temporal intensity waveform function based on a desired waveform after the Fourier transform, and then performs an inverse Fourier transform. The iterative Fourier transform unit performs the replacement using a result of multiplying a function representing the desired waveform by a coefficient, and the coefficient has a value in which a difference between the function after the multiplication and the tem-
(Continued)

poral intensity waveform function after the Fourier transform is smaller than a difference before the multiplication of the coefficient.

9 Claims, 14 Drawing Sheets

(51) Int. Cl.
*G05B 15/02* (2006.01)
*G06F 17/14* (2006.01)

(56) References Cited

U.S. PATENT DOCUMENTS

2011/0122467 A1* 5/2011 Futterer ............ G02F 1/133524
  359/9
2014/0307299 A1 10/2014 Matsumoto et al.
2014/0355985 A1 12/2014 Chu et al.

OTHER PUBLICATIONS

M. Haker et al., "Iterative Fourier transform algorithm for phase-only pulse shaping", Optics Express, vol. 9, No. 4, 2001, p. 191-p. 199.

N. Matsumoto et al., "An adaptive approach for uniform scanning in multifocal multiphoton microscopy with a spatial light modulator", Optics Express, vol. 22, No. 1, 2014, p. 633-p. 645.

M. Pasienski et al., "A high-accuracy algorithm for designing arbitrary holographic atom traps", Optics Express, vol. 16, No. 3, 2008, p. 2176-p. 2190.

O. Ripoll et al., "Review of iterative Fourier-transform algorithms for beam shaping applications", Optical Engineering, vol. 43, No. 11, 2004, p. 2549-p. 2556.

Hidetomo Takahashi et al, "Holographic femtosecond laser processing using optimal-rotation-angle methodwith compensation of spatial frequency response of liquid crystal spatial light modulator", Applied OP, Optical Society of America, Washington, DC; U.S., vol. 46, No. 23, Aug. 10, 2007, p. 5917-p. 5923, XP007903324.

* cited by examiner

*Fig.3*
(a)
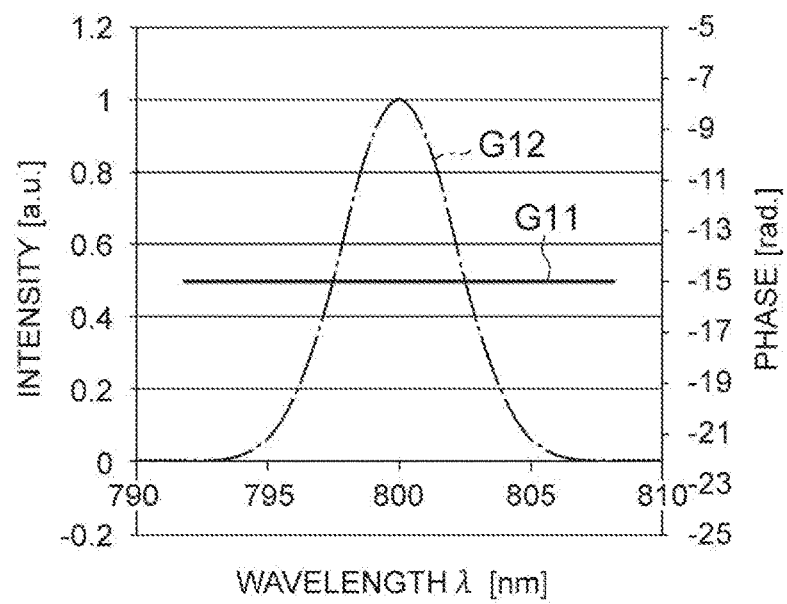
(b)
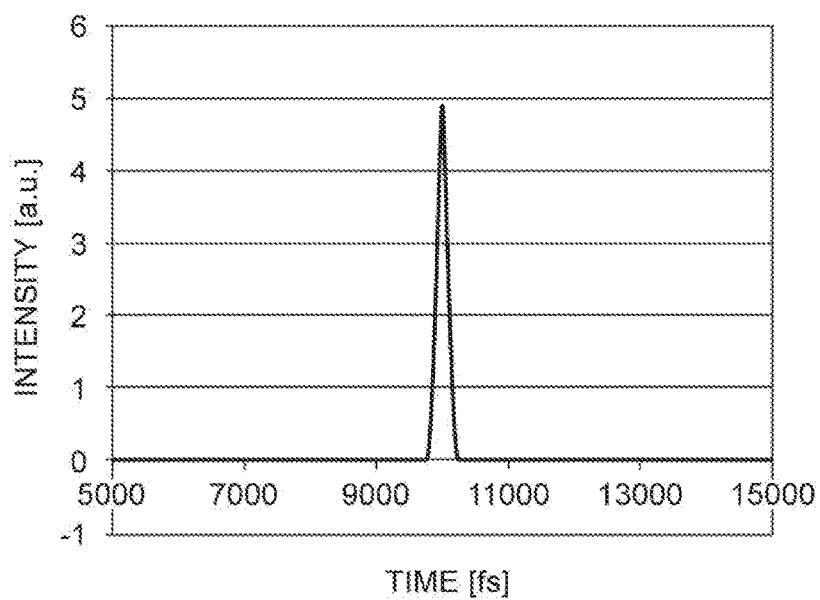

MODULATION PATTERN CALCULATION DEVICE, LIGHT CONTROL DEVICE, MODULATION PATTERN CALCULATION METHOD, MODULATION PATTERN CALCULATION PROGRAM, AND STORAGE MEDIUM

TECHNICAL FIELD

An aspect of the present invention relates to a modulation pattern calculation apparatus, a light control apparatus, a modulation pattern calculation method, a modulation pattern calculation program, and a computer readable medium.

BACKGROUND ART

Non Patent Document 1 discloses technology for modulating a phase spectrum using a spatial light modulator (SLM) to shape a light pulse. In this document, a phase spectrum to obtain a desired light pulse waveform is calculated using an iterative Fourier method (iterative Fourier transform algorithm: IFTA). Further, Non Patent Document 2 discloses an iterative Fourier method modified to avoid a solution from being led to a local solution, in phase spectrum modulation to shape a light pulse.

CITATION LIST

Non Patent Literature

Non Patent Document 1: M. Hacker, G Stobrawa, T. Feurer, "Iterative Fourier transform algorithm for phase-only pulse shaping", Optics Express, Vol. 9, No. 4, pp. 191-199, 13 Aug. 2001

Non Patent Document 2: Olivier Ripoll, Ville Kettunen, Hans Peter Herzig, "Review of iterative Fourier-transform algorithms for beam shaping applications", Optical Engineering, Vol. 43, No. 11, pp. 2549-2556, November 2004

SUMMARY OF INVENTION

Technical Problem

For example, as technology for controlling a temporal waveform of a variety of light such as ultrashort pulse light, technology for modulating a phase spectrum and an intensity spectrum of a light pulse by the SLM is known. In this technology, a modulation pattern to give, to the light, a phase spectrum and an intensity spectrum (or one of them) to bring the temporal waveform of the light close to a desired waveform is presented on the SLM. In this case, to easily realize an arbitrary temporal waveform, it is desirable to obtain these spectra by calculation.

When these spectra are obtained by the calculation, the iterative Fourier method is used as described in Non Patent Document 1, for example. However, in the iterative Fourier method, there is a problem in that a solution may be led to a local solution, and an optimal solution is not necessarily obtained. In view of the problem, in Non Patent Document 2, a difference between a desired waveform and a waveform after a Fourier transform is multiplied by a predetermined coefficient, a result is added to the desired waveform, and an iterative Fourier operation is performed. However, even in this method, for example, when the desired waveform and the waveform after the Fourier transform are greatly different from each other, the solution may be led to the local solution.

An object of one aspect of the present invention is to provide a modulation pattern calculation apparatus, a light control apparatus, a modulation pattern calculation method, a modulation pattern calculation program, and a computer readable medium capable of preventing a solution from being led to a local solution during an iterative Fourier operation and accurately calculating an intensity spectrum or a phase spectrum to bring a temporal waveform of light close to a desired waveform.

Solution to Problem

In order to solve the above problem, a modulation pattern calculation apparatus according to one aspect of the present invention is an apparatus for calculating a modulation pattern presented on a spatial light modulator for modulating at least one of an intensity spectrum and a phase spectrum of input light to bring a temporal intensity waveform of light close to a desired waveform, and the apparatus includes an iterative Fourier transform unit for performing a Fourier transform on a waveform function in a frequency domain including an intensity spectrum function and a phase spectrum function, performing a first replacement of a temporal intensity waveform function based on the desired waveform in a time domain after the Fourier transform and then performing an inverse Fourier transform, and performing a second replacement to constrain one spectrum function of the intensity spectrum function and the phase spectrum function in the frequency domain after the inverse Fourier transform, and a modulation pattern calculation unit for calculating the modulation pattern on the basis of the other spectrum function output from the iterative Fourier transform unit. The iterative Fourier transform unit performs the first replacement using a result of multiplying a function representing the desired waveform by a coefficient. The coefficient has a value in which a difference between the function after the multiplication and the temporal intensity waveform function after the Fourier transform is smaller than a difference before the multiplication of the coefficient.

Further, a modulation pattern calculation method according to one aspect of the present invention is a method for calculating a modulation pattern presented on a spatial light modulator for modulating at least one of an intensity spectrum and a phase spectrum of input light to bring a temporal intensity waveform of light close to a desired waveform, and the method includes a step (Fourier transform step) of performing a Fourier transform on a waveform function in a frequency domain including an intensity spectrum function and a phase spectrum function, a step (inverse Fourier transform step) of performing a first replacement of a temporal intensity waveform function based on the desired waveform in a time domain after the Fourier transform and then performing an inverse Fourier transform, a step (replacement step) of performing a second replacement to constrain one spectrum function of the intensity spectrum function and the phase spectrum function in the frequency domain after the inverse Fourier transform, and a step (modulation pattern calculation step) of calculating the modulation pattern on the basis of the other spectrum function output in the step of performing the second replacement. In the step of performing the inverse Fourier transform, the first replacement is performed using a result of multiplying a function representing the desired waveform by a coefficient. The coefficient has a value in which a difference between the function after the multiplication and the temporal intensity waveform function after the Fourier transform is smaller than a difference before the multiplication of the coefficient.

Further, a modulation pattern calculation program according to one aspect of the present invention is a program for causing a computer to calculate a modulation pattern presented on a spatial light modulator for modulating at least one of an intensity spectrum and a phase spectrum of input light to bring a temporal intensity waveform of light close to a desired waveform, and the program causes the computer to execute a step (Fourier transform step) of performing a Fourier transform on a waveform function in a frequency domain including an intensity spectrum function and a phase spectrum function, a step (inverse Fourier transform step) of performing a first replacement of a temporal intensity waveform function based on the desired waveform in a time domain after the Fourier transform and then performing an inverse Fourier transform, a step (replacement step) of performing a second replacement to constrain one spectrum function of the intensity spectrum function and the phase spectrum function in the frequency domain after the inverse Fourier transform, and a step (modulation pattern calculation step) of calculating the modulation pattern on the basis of the other spectrum function output in the step of performing the second replacement. In the step of performing the inverse Fourier transform, the first replacement is performed using a result of multiplying a function representing the desired waveform by a coefficient. The coefficient has a value in which a difference between the function after the multiplication and the temporal intensity waveform function after the Fourier transform is smaller than a difference before the multiplication of the coefficient.

In the above apparatus, the method, and the program, the intensity spectrum or the phase spectrum to bring the temporal intensity waveform of the light close to the desired waveform is calculated in the iterative Fourier transform unit or the replacement step. At that time, as described above, in a normal iterative Fourier method, a solution may be led to a local solution and an optimal solution is not necessarily obtained. Therefore, in the above apparatus and the method, when the replacement based on the desired waveform is performed on the temporal intensity waveform function in the time domain obtained by the Fourier transform, the result of multiplying the function representing the desired waveform by the coefficient is used. The coefficient has the value in which the difference between the function after the multiplication and the temporal intensity waveform function after the Fourier transform is smaller than the difference before the multiplication of the coefficient. As a result, because a difference between the function before the replacement (that is, the temporal intensity waveform function after the Fourier transform) and the function after the replacement based on the desired waveform decreases, the solution is prevented from being led to the local solution. Therefore, according to the above apparatus and the method, the intensity spectrum or the phase spectrum to bring the temporal waveform of the light close to the desired waveform can be accurately calculated.

Further, a light control apparatus according to one aspect of the present invention includes the modulation pattern calculation apparatus having the above configuration, a light source for outputting the input light, a dispersive element for spectrally dispersing the input light, a spatial light modulator for modulating at least one of an intensity spectrum and a phase spectrum of the input light after the dispersion and outputting modulated light, and an optical system for focusing the modulated light. The spatial light modulator presents the modulation pattern calculated by the modulation pattern calculation apparatus.

According to this apparatus, the modulation pattern calculation apparatus having the above configuration is included, so that the solution can be prevented from being led to the local solution during an iterative Fourier operation and the intensity spectrum or the phase spectrum to bring the temporal waveform of the light close to the desired waveform can be accurately calculated.

Advantageous Effects of Invention

According to a modulation pattern calculation apparatus, a light control apparatus, a modulation pattern calculation method, a modulation pattern calculation program, and a computer readable medium according to one aspect of the present invention, a solution can be prevented from being led to a local solution during an iterative Fourier operation, and an intensity spectrum or a phase spectrum to bring a temporal waveform of light close to a desired waveform can be accurately calculated.

BRIEF DESCRIPTION OF DRAWINGS

FIG. 3 includes (a) a graph illustrating an example of a combination of a certain phase spectrum and a certain intensity spectrum, and (b) a graph illustrating a temporal intensity waveform of output light realized by the combination of the phase spectrum and the intensity spectrum illustrated in (a) in FIG. 3.

DESCRIPTION OF EMBODIMENTS

Hereinafter, embodiments of a modulation pattern calculation apparatus, a light control apparatus, a modulation pattern calculation method, and a modulation pattern calculation program according to one aspect of the present invention will be described in detail with reference to the accompanying drawings. In the description of the drawings, the same elements will be denoted by the same reference signs, without redundant description.

Figure 1:
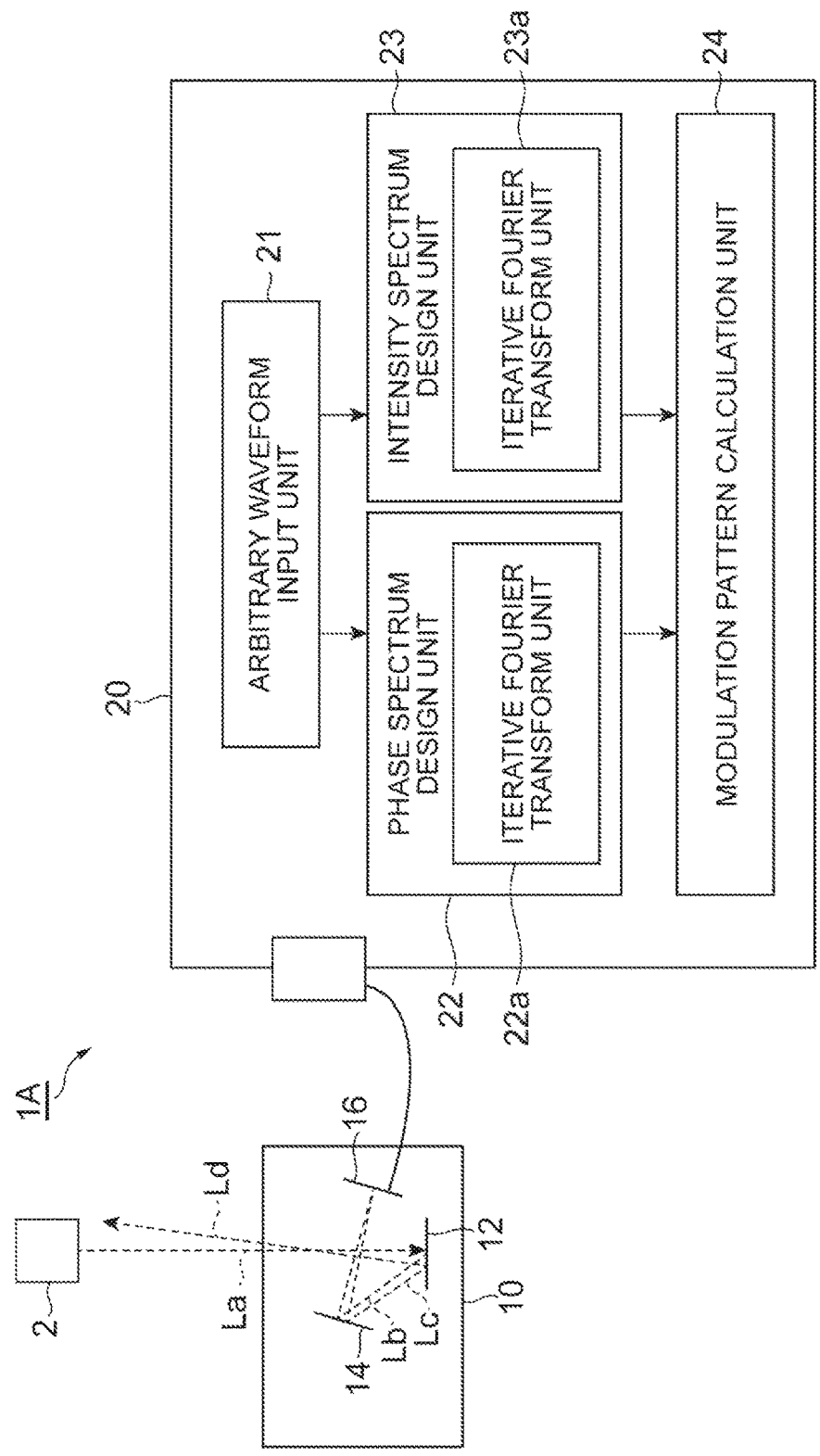
FIG. 1 is a diagram schematically illustrating a configuration of a light control apparatus according to an embodiment.

FIG. 1 is a diagram schematically illustrating a configuration of a light control apparatus 1A according to an embodiment of the present invention. The light control apparatus 1A according to the present embodiment generates, from input light La, output light Ld having an arbitrary temporal intensity waveform different from that of the input light La. As illustrated in FIG. 1, the light control apparatus 1A includes a light source 2, an optical system 10, and a modulation pattern calculation apparatus 20.

The light source 2 outputs the input light La input to the optical system 10. The light source 2 is a laser light source such as a solid-state laser light source, for example, and the input light La is coherent pulse light, for example.

The optical system 10 has a dispersive element 12, a curved mirror 14, and an SLM 16. The dispersive element 12 is optically coupled to the light source 2, and the SLM 16 is optically coupled to the dispersive element 12 via the curved mirror 14. The dispersive element 12 spectrally disperses the input light La for each wavelength component. The dispersive element 12 has a diffraction grating formed on a plate surface, for example. Further, the dispersive element 12 may have a prism. The input light La is obliquely incident on the diffraction grating, and is spectrally dispersed into a plurality of wavelength components. Light Lb including the plurality of wavelength components reaches the curved mirror 14. The light Lb is reflected by the curved mirror 14 and reaches the SLM 16.

The SLM 16 simultaneously performs phase modulation and intensity modulation of the light Lb to generate the output light Ld having an arbitrary temporal intensity waveform different from the waveform of the input light La. The SLM 16 is of a phase modulation type, for example. In one example, the SLM 16 is of an LCOS (liquid crystal on silicon) type.

Figure 2:
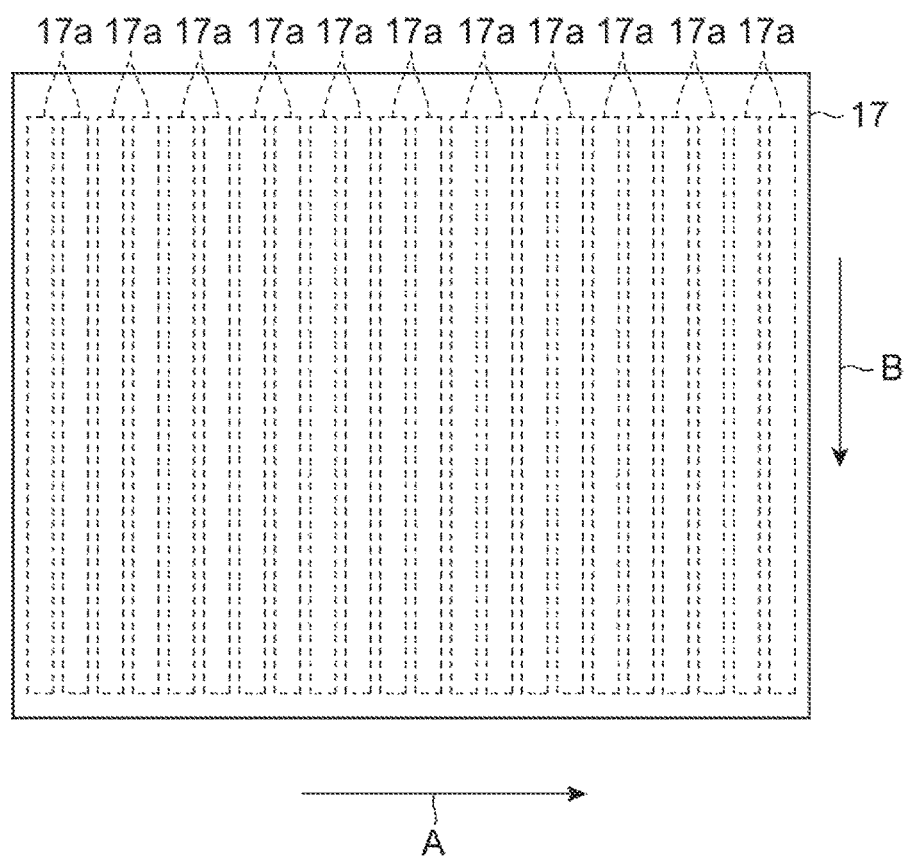
FIG. 2 is a diagram illustrating a modulation plane of an SLM.

FIG. 2 is a diagram illustrating a modulation plane 17 of the SLM 16. As illustrated in FIG. 2, in the modulation plane 17, a plurality of modulation regions 17a are arranged along a certain direction A, and each modulation region 17a extends in a direction B intersecting with the direction A. The direction A is a dispersing direction by the dispersive element 12. Therefore, each of the spectrally dispersed wavelength components is incident on each of the plurality of modulation regions 17a. The SLM 16 modulates a phase and an intensity of each incident wavelength component in each modulation region 17a. Because the SLM 16 in the present embodiment is of the phase modulation type, the intensity modulation is realized by a phase pattern (phase image) presented on the modulation plane 17.

Modulated light Lc including the respective wavelength components modulated by the SLM 16 is reflected again by the curved mirror 14 and reaches the dispersive element 12. At this time, the curved mirror 14 functions as a focusing optical system for focusing the modulated light Lc. Further, the dispersive element 12 functions as a combining optical system and combines the respective wavelength components after the modulation. That is, by the curved mirror 14 and the dispersive element 12, the plurality of wavelength components of the modulated light Lc are focused and combined with each other and become the output light Ld. The output light Ld is light having a desired temporal intensity waveform different from the waveform of the input light La.

The modulation pattern calculation apparatus 20 is a computer having an operation circuit such as a processor. The modulation pattern calculation apparatus 20 is electrically coupled to the SLM 16, calculates a phase modulation pattern to bring the temporal intensity waveform of the output light Ld close to a desired waveform, and provides a control signal including the phase modulation pattern to the SLM 16.

The modulation pattern calculation apparatus 20 of the present embodiment presents, on the SLM 16, a phase pattern including a phase pattern for phase modulation that gives a phase spectrum for obtaining the desired waveform to the output light Ld and a phase pattern for intensity modulation that gives an intensity spectrum for obtaining the desired waveform to the output light Ld. For this purpose, the modulation pattern calculation apparatus 20 includes an arbitrary waveform input unit 21, a phase spectrum design unit 22, an intensity spectrum design unit 23, and a modulation pattern calculation unit 24. That is, the operation circuit (for example, the processor of the computer) provided in the modulation pattern calculation apparatus 20 realizes a function of the arbitrary waveform input unit 21, a function of the phase spectrum design unit 22, a function of the intensity spectrum design unit 23, and a function of the modulation pattern calculation unit 24. The respective functions may be realized by the same operation circuit or may be realized by different operation circuits.

The operation circuit (for example, the processor of the computer) can realize the above respective functions by a modulation pattern calculation program. Therefore, the modulation pattern calculation program operates the operation circuit (for example, the processor of the computer) as the arbitrary waveform input unit 21, the phase spectrum design unit 22, the intensity spectrum design unit 23, and the modulation pattern calculation unit 24 in the modulation pattern calculation apparatus 20. The modulation pattern calculation program is stored in a storage device (non-transitory computer readable medium) inside or outside the computer.

The arbitrary waveform input unit 21 receives the desired temporal intensity waveform input from an operator. The operator inputs information (for example, a pulse width) on the desired temporal intensity waveform to the arbitrary waveform input unit 21.

The information on the desired temporal intensity waveform is given to the phase spectrum design unit 22 and the intensity spectrum design unit 23. The phase spectrum design unit 22 calculates a corresponding phase spectrum of the output light Ld, on the basis of the temporal intensity waveform. The intensity spectrum design unit 23 calculates a corresponding intensity spectrum of the output light Ld, on the basis of the temporal intensity waveform.

The modulation pattern calculation unit 24 is an example of a modulation pattern calculation unit according to one aspect of the present invention and calculates a phase modulation pattern to give the phase spectrum obtained in the phase spectrum design unit 22 and the intensity spectrum obtained in the intensity spectrum design unit 23 to the output light Ld. Further, a control signal including the calculated phase modulation pattern is provided to the SLM 16.

Here, a method of calculating a phase spectrum and an intensity spectrum corresponding to a desired temporal intensity waveform is described in detail. (a) in FIG. 3 is a graph illustrating an example of a combination of a certain phase spectrum G11 and a certain intensity spectrum G12. Further, (b) in FIG. 3 is a graph illustrating a temporal intensity waveform of the output light Ld realized by the combination of the phase spectrum and the intensity spectrum illustrated in (a) in FIG. 3. In (a) in FIG. 3, a horizontal axis shows a wavelength (nm), a left vertical axis shows an intensity value (arbitrary unit) of the intensity spectrum, and a right vertical axis shows a phase value (rad) of the phase spectrum. Further, in (b) in FIG. 3, a horizontal axis shows a time (femtosecond) and a vertical axis shows a light intensity (arbitrary unit). The spectra and the waveform illustrated in FIG. 3 are examples, and the temporal intensity waveform of the output light Ld can be controlled in various forms by combinations of various phase spectra and intensity spectra.

The desired temporal intensity waveform is represented as a function in a time domain, and the phase spectrum and the intensity spectrum are represented as functions in a frequency domain. Therefore, the phase spectrum and the intensity spectrum corresponding to the desired temporal intensity waveform are obtained by an iterative Fourier transform based on the desired temporal intensity waveform. In the method described below, the phase spectrum and the intensity spectrum are calculated using an iterative Fourier transform method. Therefore, as illustrated in FIG. 1, the phase spectrum design unit 22 has an iterative Fourier transform unit 22a. Further, the intensity spectrum design unit 23 has an iterative Fourier transform unit 23a.

Figure 4:
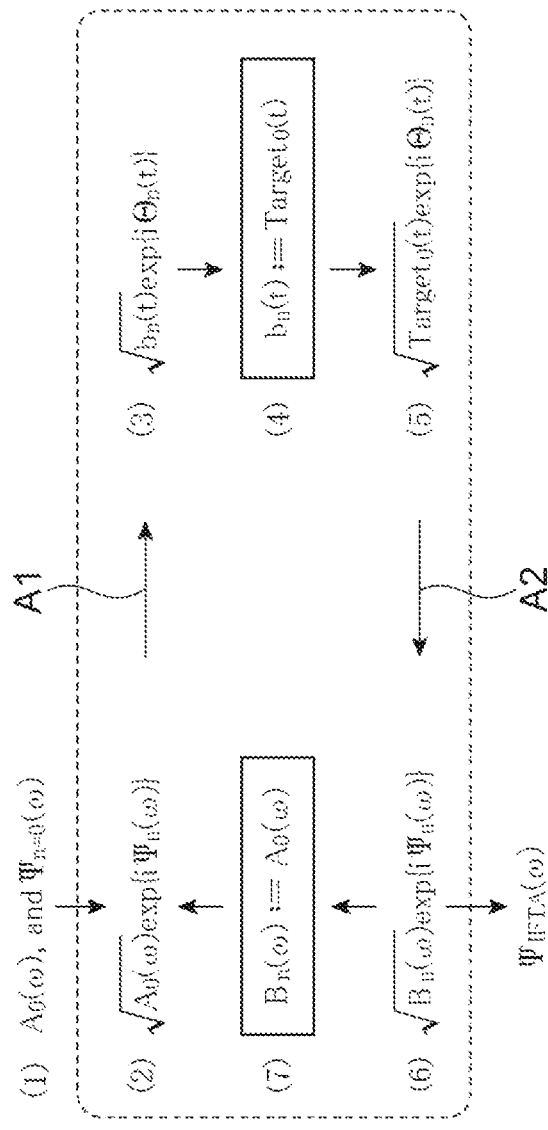
FIG. 4 is a diagram illustrating a calculation procedure of a phase spectrum using a normal iterative Fourier method, as a first comparative example.

However, in a normal iterative Fourier method, as described above, a solution may be led to a local solution and an optimal solution is not necessarily obtained. Further, there are problems in that it takes long time to converge calculation (that is, the number of iterations increases) and intensity loss increases. FIG. 4 illustrates a calculation procedure of a phase spectrum using the normal iterative Fourier method, as a first comparative example for the present embodiment.

First, an initial intensity spectrum function $A_0(\omega)$ and a phase spectrum function $\Psi_{n=0}(\omega)$ to be functions of a frequency $\omega$ are prepared (process number (1) in the drawing). In one example, the intensity spectrum function $A_0(\omega)$ and the phase spectrum function $\Psi_{n=0}(\omega)$ represent the intensity spectrum and the phase spectrum of the input light La, respectively. Next, a waveform function (a) in the frequency domain including the intensity spectrum function $A_0(\omega)$ and the phase spectrum function $\Psi_n(\omega)$ is prepared (process number (2) in the drawing).

[Formula 1]

$$\sqrt{A_0(\omega)}\exp\{i\Psi_n(\omega)\} \quad (a)$$

Here, a subscript n represents after an n-th Fourier transform process. Before a first Fourier transform process, the initial phase spectrum function $\Psi_{n=0}(\omega)$ described above is used as the phase spectrum function $\Psi_n(\omega)$. i is an imaginary number.

Next, a Fourier transform from the frequency domain to the time domain is performed on the function (a) (arrow A1 in the drawing). As a result, a waveform function (b) in the frequency domain including a temporal intensity waveform function $b_n(t)$ is obtained (process number (3) in the drawing).

[Formula 2]

$$\sqrt{b_n(t)}\exp\{i\Theta_n(t)\} \quad (b)$$

Next, the temporal intensity waveform function $b_n(t)$ included in the function (b) is replaced by $\mathrm{Target}_0(t)$ based on the desired waveform (process numbers (4) and (5) in the drawing).

[Formula 3]

$$b_n(t):=\mathrm{Target}_0(t) \quad (c)$$

[Formula 4]

$$\sqrt{\mathrm{Target}_0(t)}\exp\{i\Theta_n(t)\} \quad (d)$$

Next, an inverse Fourier transform from the time domain to the frequency domain is performed on the function (d) (arrow A2 in the drawing). As a result, a waveform function (e) in the frequency domain including an intensity spectrum function $B_n(\omega)$ and the phase spectrum function $\Psi_n(\omega)$ is obtained (process number (6) in the drawing).

[Formula 5]

$$\sqrt{B_n(\omega)}\exp\{i\Psi_n(\omega)\} \quad (e)$$

Next, to constrain the intensity spectrum function $B_n(\omega)$ included in the function (e), this is replaced by the initial intensity spectrum function $A_0(\omega)$ (process number (7) in the drawing).

[Formula 6]

$$B_n(\omega):=A_0(\omega) \quad (f)$$

Subsequently, the above processes (1) to (7) are repeatedly performed a plurality of times, so that the phase spectrum form represented by the phase spectrum function $\Psi_n(\omega)$ in the waveform function can be brought close to a phase spectrum form corresponding to the desired temporal intensity waveform. A phase spectrum function $\Psi_{IFTA}(\omega)$ to be finally obtained is used to calculate the modulation pattern.

Figure 5:
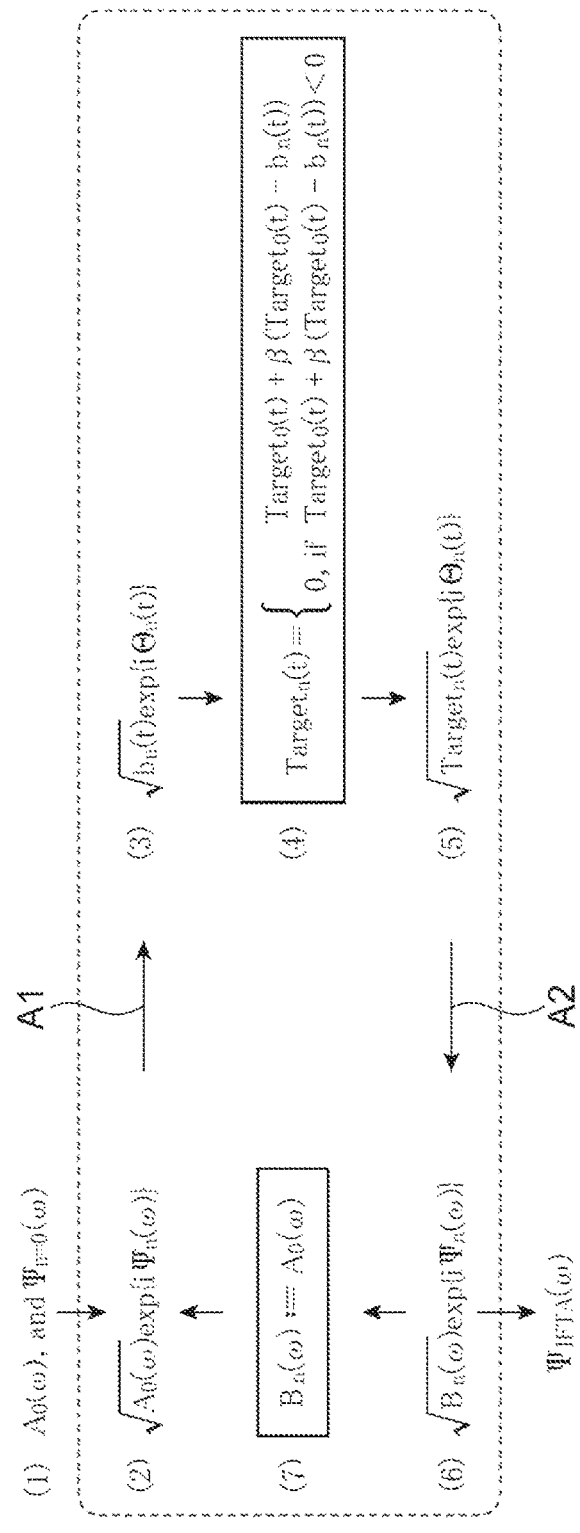
FIG. 5 is a diagram illustrating a calculation procedure of a phase spectrum using an iterative Fourier method described in Non Patent Document 2, as a second comparative example.

For the normal iterative Fourier method described above, a process for preventing a solution from being led to a local solution is included in a method described in Non Patent Document 2. FIG. 5 illustrates a calculation procedure of a phase spectrum using an iterative Fourier method (hereinafter, referred to as IFTA-Fienup) described in Non Patent Document 2, as a second comparative example for the present embodiment. Here, in FIG. 5, because processes (1) to (3), (6) to (7) are the same as the processes in the above-described method, explanation is omitted.

In IFTA-Fienup, when processes (4) and (5) are executed, that is, a replacement based on a desired waveform is performed on the temporal intensity waveform function $b_n(t)$ included in the function (b) after the Fourier transform, instead of $\mathrm{Target}_0(t)$, $\mathrm{Target}_n(t)$ calculated by the following formula (g) is used (process numbers (4) and (5) in the drawing).

[Formula 7]

$$\mathrm{Target}_n(t) = \begin{cases} \mathrm{Target}_0(t) + \beta(\mathrm{Target}_0(t) - b_n(t)) \\ 0, \quad \text{if } \mathrm{Target}_0(t) + \beta(\mathrm{Target}_0(t) - b_n(t)) < 0 \end{cases} \quad (g)$$

[Formula 8]

$$\sqrt{\mathrm{Target}_n(t)}\exp\{i\Theta_n(t)\} \quad (h)$$

Here, in the above formula (g), a difference $(\mathrm{Target}_0(t)-b_n(t))$ between the function $\mathrm{Target}_0(t)$ representing the desired waveform and the waveform function $b_n(t)$ after the Fourier transform is multiplied by a predetermined coefficient $\beta$, a multiplication result is added to the desired waveform $\text{Target}_0(t)$, and $\text{Target}_n(t)$ is calculated. Further, when this value is smaller than 0, $\text{Target}_n(t)=0$ is set.

However, even in IFTA-Fienup, for example, when the function $\text{Target}_0(t)$ representing the desired waveform and the waveform function $b_n(t)$ after the Fourier transform are greatly different from each other, a solution may still be led to a local solution.

Figure 6:
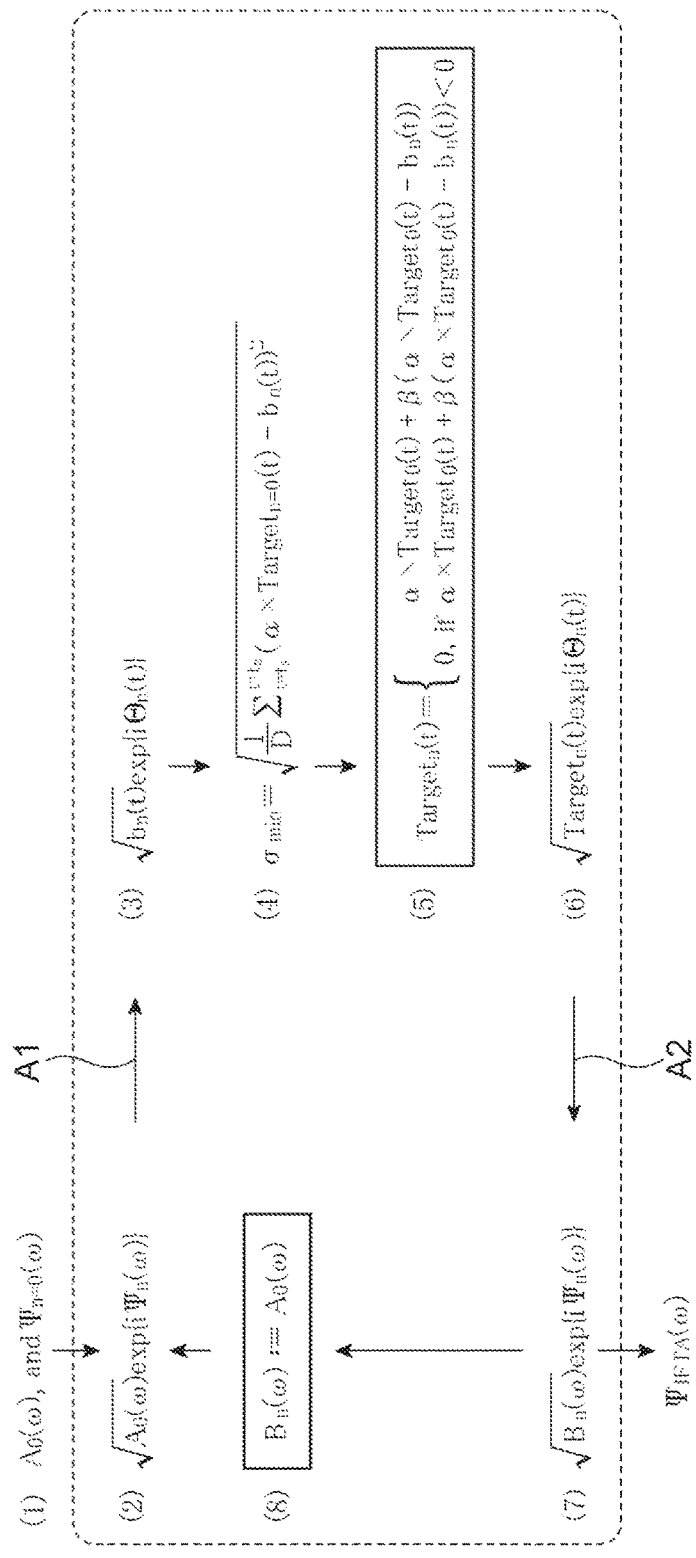
FIG. 6 is a diagram illustrating a calculation procedure of a phase spectrum using an improved iterative Fourier method in an embodiment.

Therefore, in the iterative Fourier transform unit 22a of the phase spectrum design unit 22 in the present embodiment, the iterative Fourier method is further improved as described below. FIG. 6 illustrates a calculation procedure of a phase spectrum using the improved iterative Fourier method in the present embodiment.

First, the iterative Fourier transform unit 22a prepares the initial intensity spectrum function $A_0(\omega)$ and the phase spectrum function $\Psi_{n=0}(\omega)$ to be the functions of the frequency $\omega$ (process number (1) in the drawing). In one example, the intensity spectrum function $A_0(\omega)$ and the phase spectrum function $\Psi_{n=0}(\omega)$ represent the intensity spectrum and the phase spectrum of the input light La, respectively.

Next, the iterative Fourier transform unit 22a prepares a waveform function (i) in the frequency domain including the intensity spectrum function $A_0(\omega)$ and the phase spectrum function $\Psi_n(\omega)$ (process number (2) in the drawing).

[Formula 9]

$$\sqrt{A_0(\omega)}\exp\{i\Psi_n(\omega)\} \qquad (i)$$

Here, a subscript n represents after an n-th Fourier transform process. Before a first Fourier transform process, the initial phase spectrum function $\Psi_{n=0}(\omega)$ described above is used as the phase spectrum function $\Psi_n(\omega)$. i is an imaginary number.

Next, the iterative Fourier transform unit 22a performs the Fourier transform from the frequency domain to the time domain on the function (i). As a result, a waveform function (j) in the frequency domain including the temporal intensity waveform function $b_n(t)$ is obtained (process number (3) in the drawing).

[Formula 10]

$$\sqrt{b_n(t)}\exp\{i\Theta_n(t)\} \qquad (j)$$

Next, the iterative Fourier transform unit 22a calculates a coefficient $\alpha$ in which a difference between the waveform function $b_n(t)$ after the Fourier transform and a result ($\alpha \times \text{Target}_0(t)$) of multiplying the function $\text{Target}_0(t)$ by the coefficient $\alpha$ becomes smaller than a difference between the waveform function $b_n(t)$ and the function $\text{Target}_0(t)$ (process number (4) in the drawing). In one example, as shown by the following formula (k), a coefficient $\alpha$ in which a standard deviation $\sigma$ of $\alpha \times \text{Target}_0(t)$ with respect to the waveform function $b_n(t)$ after the Fourier transform becomes a minimum ($\sigma_{min}$) is derived by searching. Here, in the formula (k), D represents the number of data points and ts and te represent a start point and an end point of a time axis, respectively.

[Formula 11]

$$\sigma_{min} = \sqrt{\frac{1}{D}\sum_{t=t_s}^{t=t_e}(\alpha \times \text{Target}_{n=0}(t) - b_n(t))^2} \qquad (k)$$

Next, the iterative Fourier transform unit 22a performs a replacement based on the desired waveform on the temporal intensity waveform function $b_n(t)$ included in the function (j) after the Fourier transform (first replacement). At this time, the iterative Fourier transform unit 22a performs the replacement using the result ($\alpha \times \text{Target}_0(t)$) of multiplying the function $\text{Target}_0(t)$ representing the desired waveform by the coefficient $\alpha$. In one example, the replacement is performed by $\text{Target}_n(t)$ calculated by the formula (m) obtained by replacing $\text{Target}_0(t)$ in the formula (g) in IFTA-Fienup described above by $\alpha \times \text{Target}_0(t)$ (process numbers (5) and (6) in the drawing).

[Formula 12]

$$\text{Target}_n(t) = \begin{cases} \alpha \times \text{Target}_0(t) + \beta(\alpha \times \text{Target}_0(t) - b_n(t)) & (m) \\ 0, & \text{if } \alpha \times \text{Target}_0(t) + \beta(\alpha \times \text{Target}_0(t) - b_n(t)) < 0 \end{cases}$$

[Formula 13]

$$\sqrt{\text{Target}_n(t)}\exp\{i\Theta_n(t)\} \qquad (n)$$

Next, the iterative Fourier transform unit 22a performs the inverse Fourier transform from the time domain to the frequency domain on the function (n) (arrow A2 in the drawing). As a result, a waveform function (o) in the frequency domain including the intensity spectrum function $B_n(\omega)$ and the phase spectrum function $\Psi_n(\omega)$ is obtained (process number (7) in the drawing).

[Formula 14]

$$\sqrt{B_n(\omega)}\exp\{i\Psi_n(\omega)\} \qquad (o)$$

Next, the iterative Fourier transform unit 22a, to constrain the intensity spectrum function $B_n(\omega)$ included in the function (o), replaces the function by the initial intensity spectrum function $A_0(\omega)$ (second replacement, process number (8) in the drawing).

[Formula 15]

$$B_n(\omega) := A_0(\omega) \qquad (p)$$

Subsequently, the iterative Fourier transform unit 22a repeatedly performs the above processes (1) to (8) a plurality of times, so that the phase spectrum form represented by the phase spectrum function $\Psi_n(\omega)$ in the waveform function can be brought close to a phase spectrum form corresponding to the desired temporal intensity waveform. A phase spectrum function $\Psi_{IFTA}(\omega)$ to be finally obtained is provided to the modulation pattern calculation unit 24.

Figure 7:
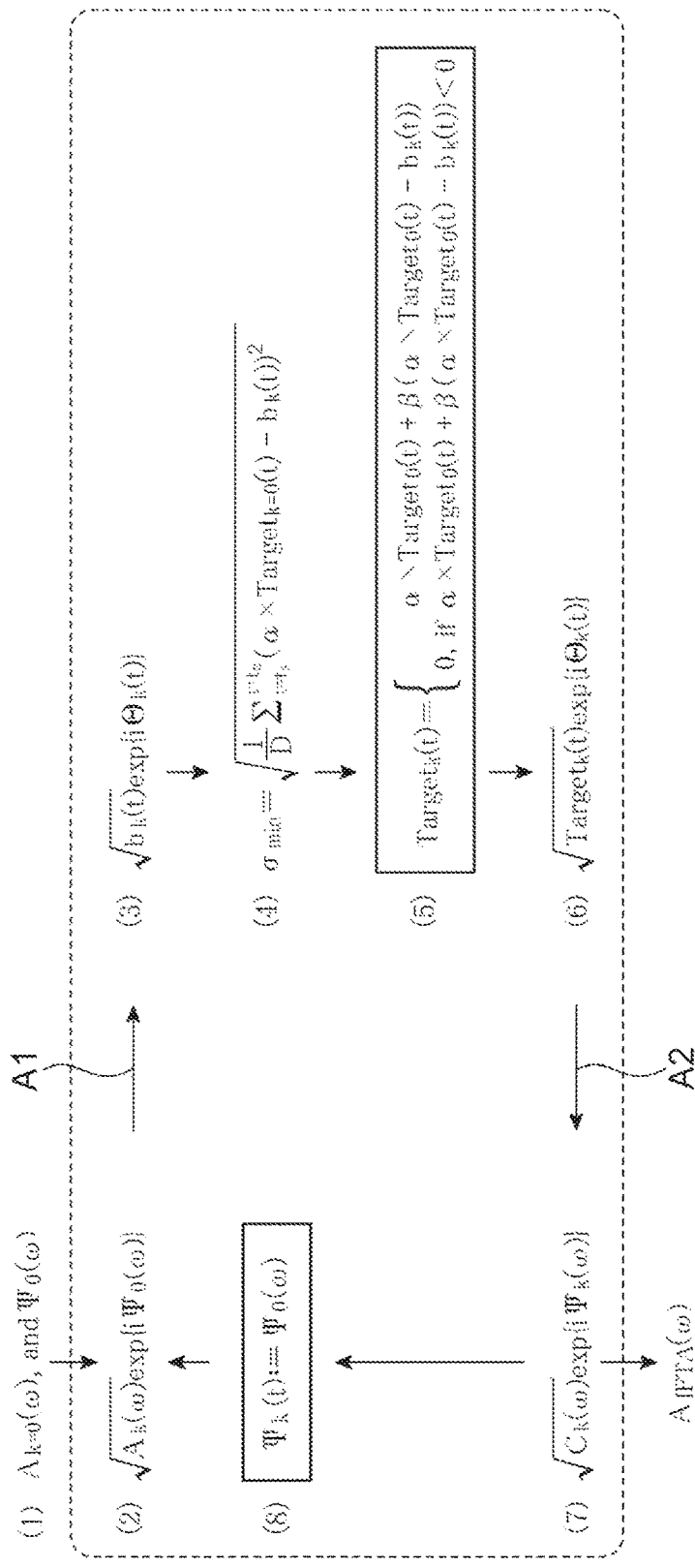
FIG. 7 is a diagram illustrating a calculation procedure in an iterative Fourier transform unit of an intensity spectrum design unit.

FIG. 7 illustrates a calculation procedure in the iterative Fourier transform unit 23a of the intensity spectrum design unit 23. The iterative Fourier transform unit 23a calculates an intensity spectrum by the similar method as the calculation method by the iterative Fourier transform unit 22a described above.

First, similar to when the phase spectrum is calculated, the iterative Fourier transform unit 23a prepares an initial intensity spectrum function $A_{k=0}(\omega)$ and a phase spectrum function $\Psi_0(\omega)$ (process number (1) in the drawing). Next, the iterative Fourier transform unit 23a prepares a waveform function (q) in the frequency domain including an intensity spectrum function $A_k(\omega)$ and the phase spectrum function $\Psi_0(\omega)$ (process number (2) in the drawing).

[Formula 16]

$$\sqrt{A_k(\omega)}\exp\{i\Psi_0(\omega)\} \qquad (q)$$

Here, a subscript k represents after a k-th Fourier transform process. Before a first Fourier transform process, the initial intensity spectrum function $A_{k=0}(\omega)$ described above is used as the intensity spectrum function $A_k(\omega)$. i is an imaginary number.

Next, the iterative Fourier transform unit 23a performs the Fourier transform from the frequency domain to the time domain on the function (q). As a result, a waveform function (r) in the frequency domain including a temporal intensity waveform function $b_k(t)$ is obtained (process number (3) in the drawing).

[Formula 17]

$$\sqrt{b_k(t)}\exp\{i\Theta_k(t)\} \quad (r)$$

Next, the iterative Fourier transform unit 23a calculates a coefficient α in which a difference between the waveform function $b_k(t)$ after the Fourier transform and a result (α×Target$_0$(t)) of multiplying the function Target$_0$(t) by the coefficient α becomes smaller than a difference between the waveform function $b_k(t)$ and the function Target$_0$(t) (process number (4) in the drawing). In one example, as shown by the following formula (s), a coefficient α in which a standard deviation σ of α×Target$_0$(t) with respect to the waveform function $b_k(t)$ after the Fourier transform becomes a minimum ($\sigma_{min}$) is derived by searching. Here, in the formula (s), D represents the number of data points and ts and te represent a start point and an end point of a time axis, respectively.

[Formula 18]

$$\sigma_{min} = \sqrt{\frac{1}{D}\sum_{t=t_s}^{t=t_e}(\alpha \times \text{Target}_{k=0}(t) - b_k(t))^2} \quad (s)$$

Next, the iterative Fourier transform unit 23a performs a replacement based on the desired waveform on the temporal intensity waveform function $b_k(t)$ included in the function (r) after the Fourier transform (first replacement). At this time, the iterative Fourier transform unit 23a performs the replacement using the result (α×Target$_0$(t)) of multiplying the function Target$_0$(t) representing the desired waveform by the coefficient α. In one example, the replacement is performed by Target$_k$(t) calculated by the formula (t) (process numbers (5) and (6) in the drawing).

[Formula 19]

$$\text{Target}_k(t) = \begin{cases} \alpha \times \text{Target}_0(t) + \beta(\alpha \times \text{Target}_0(t) - b_k(t)) \\ 0, \text{ if } \alpha \times \text{Target}_0(t) + \beta(\alpha \times \text{Target}_0(t) - b_k(t)) < 0 \end{cases} \quad (t)$$

[Formula 20]

$$\sqrt{\text{Target}_k(t)}\exp\{i\Theta_k(t)\} \quad (u)$$

Next, the iterative Fourier transform unit 23a performs the inverse Fourier transform from the time domain to the frequency domain on the function (u). As a result, a waveform function (v) in the frequency domain including an intensity spectrum function $C_k(\omega)$ and a phase spectrum function $\Psi_k(\Psi)$ is obtained (process number (7) in the drawing).

[Formula 21]

$$\sqrt{C_k(\omega)}\exp\{i\Psi_k(\omega)\} \quad (v)$$

Next, the iterative Fourier transform unit 23a, to constrain the phase spectrum function $\Psi_k(\omega)$ included in the function (v), replaces the function by the initial phase spectrum function $\Psi_0(\omega)$ (second replacement, process number (8) in the drawing).

[Formula 22]

$$\Psi_k(\omega) := \Psi_0(\omega) \quad (w)$$

Subsequently, the iterative Fourier transform unit 23a repeatedly performs the above processes (1) to (8) a plurality of times, so that the phase spectrum form represented by the intensity spectrum function $A_k(\omega)$ in the waveform function can be brought close to an intensity spectrum form corresponding to the desired temporal intensity waveform. An intensity spectrum function $A_{IFTA}(\bullet)$ to be finally obtained is provided to the modulation pattern calculation unit 24.

Figure 8:
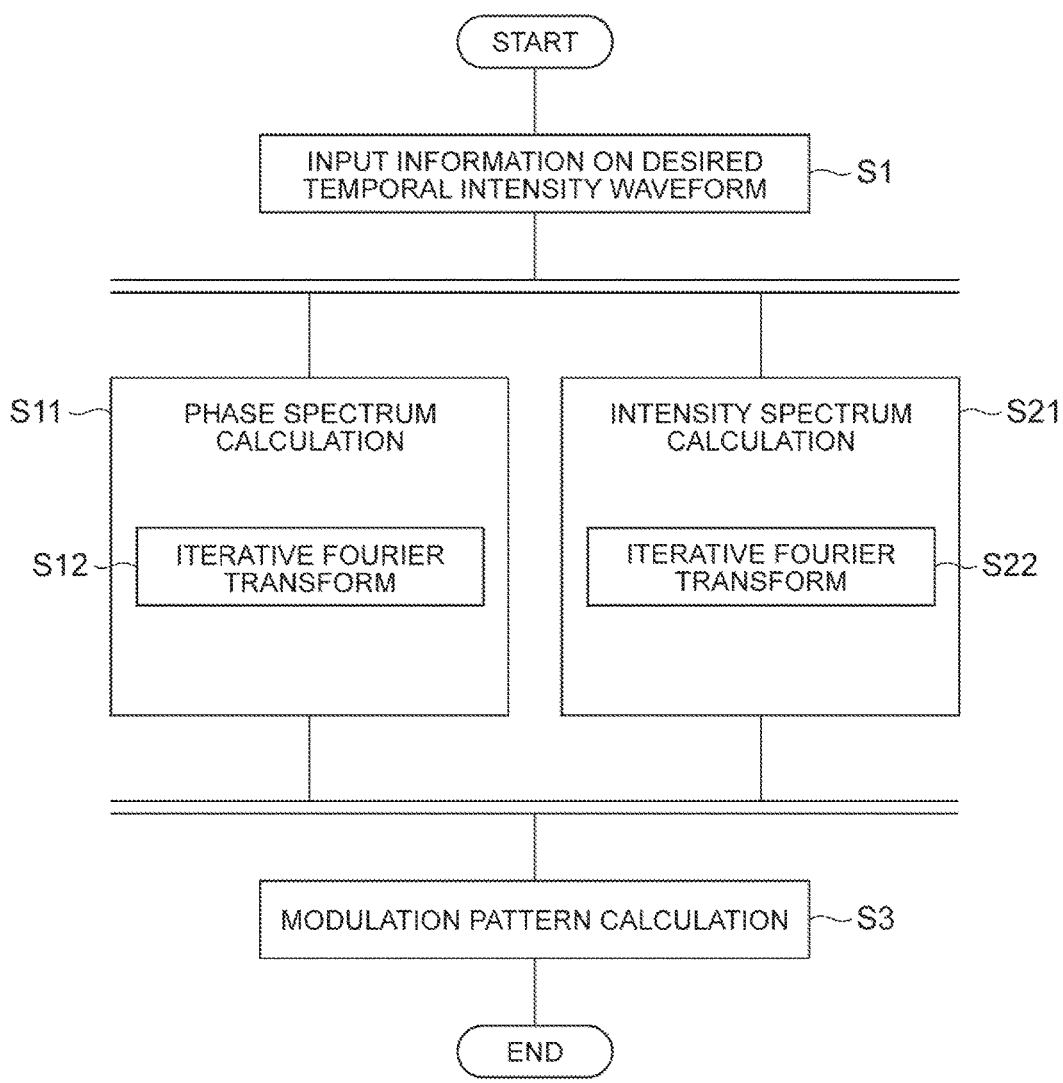
FIG. 8 is a flowchart illustrating a modulation pattern calculation method.

FIG. 8 is a flowchart illustrating a modulation pattern calculation method realized by the modulation pattern calculation apparatus 20 described above. As illustrated in FIG. 8, first, information on a desired temporal intensity waveform is input to the arbitrary waveform input unit 21 by the operator (input step S1). Next, a phase spectrum and an intensity spectrum to bring the temporal intensity waveform close to a desired waveform are calculated in the phase spectrum design unit 22 and the intensity spectrum design unit 23, respectively (phase spectrum calculation step S11 and intensity spectrum calculation step S21).

An iterative Fourier transform step S12 by the iterative Fourier transform unit 22a is included in the phase spectrum calculation step S11.

That is, in the iterative Fourier transform step S12, the Fourier transform is performed on the waveform function (formula (i)) in the frequency domain including the intensity spectrum function $A_0(\omega)$ and the phase spectrum function $\Psi_n(\omega)$, the replacement of the temporal intensity waveform function based on the desired waveform is performed in the time domain after the Fourier transform (formulas (m) and (n)), and the replacement to constrain the intensity spectrum function is performed in the frequency domain after the inverse Fourier transform (formula (p)). In the iterative Fourier transform step S12, these processes are repeatedly performed a plurality of times, so that the phase spectrum function $\Psi_n(\omega)$ is brought close to a phase spectrum form corresponding to the desired waveform. A phase spectrum function $\Psi_{IFTA}(\omega)$ to be finally obtained is provided to a next modulation pattern calculation step S3.

Further, an iterative Fourier transform step S22 by the iterative Fourier transform unit 23a is included in the intensity spectrum calculation step S21.

That is, in the iterative Fourier transform step S22, the Fourier transform is performed on the waveform function (formula (q)) in the frequency domain including the intensity spectrum function $A_k(\omega)$ and the phase spectrum function $\Psi_0(\omega)$, the replacement of the temporal intensity waveform function based on the desired waveform is performed in the time domain after the Fourier transform (formulas (t) and (u)), and the replacement to constrain the phase spectrum function is performed in the frequency domain after the inverse Fourier transform (formula (w)). In the iterative Fourier transform step S22, these processes are repeatedly performed a plurality of times, so that the intensity spectrum function $A_k(\omega)$ is brought close to an intensity spectrum form corresponding to the desired waveform. An intensity spectrum function $A_{IFTA}(\omega)$ to be finally obtained is provided to the next modulation pattern calculation step S3.

In the modulation pattern calculation step S3, a modulation pattern is calculated on the basis of the phase spectrum function $\Psi_{IFTA}(\omega)$ and the intensity spectrum function $A_{IFTA}(\omega)$. The modulation pattern is presented on the SLM 16.

Effects obtained by the modulation pattern calculation apparatus 20 and the modulation pattern calculation method according to the present embodiment described above are described.

In the present embodiment, the intensity spectrum and the phase spectrum to bring the temporal intensity waveform of the light close to the desired waveform are calculated in the iterative Fourier transform units 22a and 23a (or the iterative Fourier transform steps S12 and S22), respectively. At that time, when the replacement based on the desired waveform is performed on the temporal intensity waveform function $b_n(t)$ (or $b_k(t)$) in the time domain obtained by the Fourier transform, a result of multiplying the function $Target_0(t)$ representing the desired waveform by the coefficient $\alpha$ is used. The coefficient $\alpha$ has a value in which a difference between the function $\alpha \times Target_0(t)$ after the multiplication and the temporal intensity waveform function $b_n(t)$ (or $b_k(t)$) after the Fourier transform is smaller than a difference before the multiplication of the coefficient $\alpha$. As a result, because a difference between the function before the replacement (that is, the temporal intensity waveform function $b_n(t)$ or $b_k(t)$ after the Fourier transform) and the function $Target_n(t)$ (or $Target_k(t)$) after the replacement based on the desired waveform decreases, a solution is prevented from being led to a local solution. Therefore, according to the present embodiment, the intensity spectrum and the phase spectrum to bring the temporal waveform of the light close to the desired waveform can be accurately calculated.

In particular, when the intensity spectrum function $A_{IFTA}(\omega)$ is derived by the iterative Fourier method, the intensity spectrum after the inverse Fourier transform may exceed the intensity spectrum of the input light La depending on a wavelength region. In this case, because realization is impossible for a part exceeding the intensity spectrum of the input light La, intensity loss occurs with the iterative calculation and the intensity of the temporal intensity waveform $b_n(t)$ gradually decreases. Therefore, in the conventional iterative Fourier method, a difference between the waveform $Target_0(t)$ after the replacement and the temporal intensity waveform $b_n(t)$ (or $b_k(t)$) tends to increase and a risk of the solution being led to the local solution increases. On the other hand, according to the present embodiment, because a difference between the waveform function $Target_n(t)$ (or $Target_k(t)$) after the replacement and the temporal intensity waveform $b_n(t)$ (or $b_k(t)$) can be decreased, it is possible to reduce the risk of the solution being led to the local solution while suppressing the intensity loss.

Further, as in the present embodiment, the iterative Fourier transform units 22a and 23a (in the iterative Fourier transform steps S12 and S22) may repeatedly perform the Fourier transform, the first replacement, the inverse Fourier transform, and the second replacement, and the modulation pattern calculation unit 24 (in the modulation pattern calculation step S3) may calculate the modulation pattern on the basis of the phase spectrum function $\Psi_{IFTA}(\omega)$ and the intensity spectrum function $\Psi_{IFTA}(\omega)$ obtained after the repetition. As such, the iterative Fourier transform is repeatedly performed, so that the intensity spectrum $A_{IFTA}(\omega)$ and the phase spectrum $\Psi_{IFTA}(\omega)$ to bring the temporal intensity waveform of the light close to the desired waveform can be calculated more accurately.

Further, as in the present embodiment, the coefficient $\alpha$ may have a value in which the standard deviation $\sigma$ of the function $\alpha \times Target_0(t)$ after the multiplication with respect to the temporal intensity waveform function $b_n(t)$ (or $b_k(t)$) after the Fourier transform becomes a minimum value $\sigma_{min}$. As a result, a difference between the function $\alpha \times Target_0(t)$ after the multiplication of the coefficient $\alpha$ and the temporal intensity waveform function $b_n(t)$ (or $b_k(t)$) after the Fourier transform can be minimized, and the solution can be more effectively prevented from being led to the local solution.

Here, in the above embodiment, both the phase spectrum function $\Psi_{IFTA}(\omega)$ and the intensity spectrum function $A_{IFTA}(\omega)$ are calculated to bring the temporal intensity waveform close to the desired waveform, and the modulation pattern based on these functions is presented on the SLM 16. However, the present invention is not limited to such a configuration, and for example, only one of the phase spectrum function $\Psi_{IFTA}(\omega)$ and the intensity spectrum function $A_{IFTA}$ to bring the temporal intensity waveform close to the desired waveform may be calculated. In this case, a previously prepared (or selected) spectrum may be used as the other spectrum, or the other spectrum may not be modulated as the input light La. Even in any configuration, the effects according to the present embodiment can be surely obtained.

Figure 9:
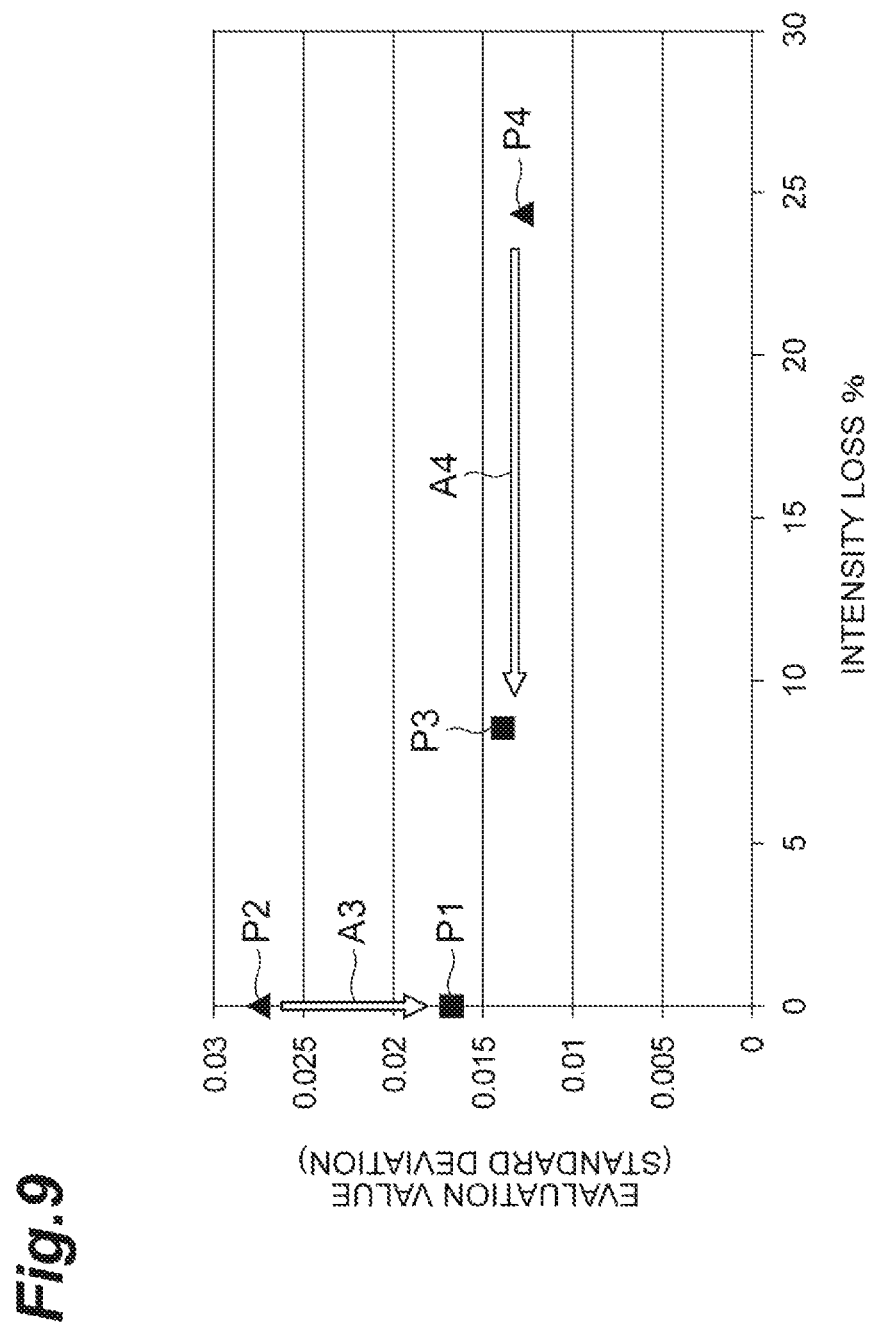
FIG. 9 is a graph illustrating intensity loss and waveform accuracy with waveform control.

FIG. 9 is a graph illustrating intensity loss and waveform accuracy with waveform control. As an index of the waveform accuracy, a standard deviation with respect to the desired waveform (in the case of introducing the coefficient $\alpha$, a standard deviation with respect to a waveform obtained by multiplying the desired waveform by the finally obtained coefficient $\alpha$) is used.

A plot P1 in the drawing shows the case in which modulation based on only the phase spectrum function $\Psi_{IFTA}(\omega)$ obtained by introducing the coefficient $\alpha$ is performed, and a plot P2 shows the case in which modulation based on only the phase spectrum function $\Psi_{IFTA}(\omega)$ obtained (that is, obtained by IFTA-Fienup) without introducing the coefficient $\alpha$ is performed. Further, a plot P3 shows the case in which modulation based on both the phase spectrum function $\Psi_{IFTA}(\omega)$ and the intensity spectrum function $A_{IFTA}$ obtained by introducing the coefficient $\alpha$ is performed, and a plot P4 shows the case in which modulation based on the phase spectrum function $\Psi_{IFTA}((\omega))$ and the intensity spectrum function $A_{IFTA}$ obtained (that is, obtained by IFTA-Fienup) without introducing the coefficient $\alpha$ is performed.

Here, these plots P1 to P4 are calculation results under a condition that the number of iterations in the iterative Fourier method is 200 times and a pulse waveform of a time width of about 135 fs is controlled to a rectangular waveform of a time width of 2 ps.

Figure 10:
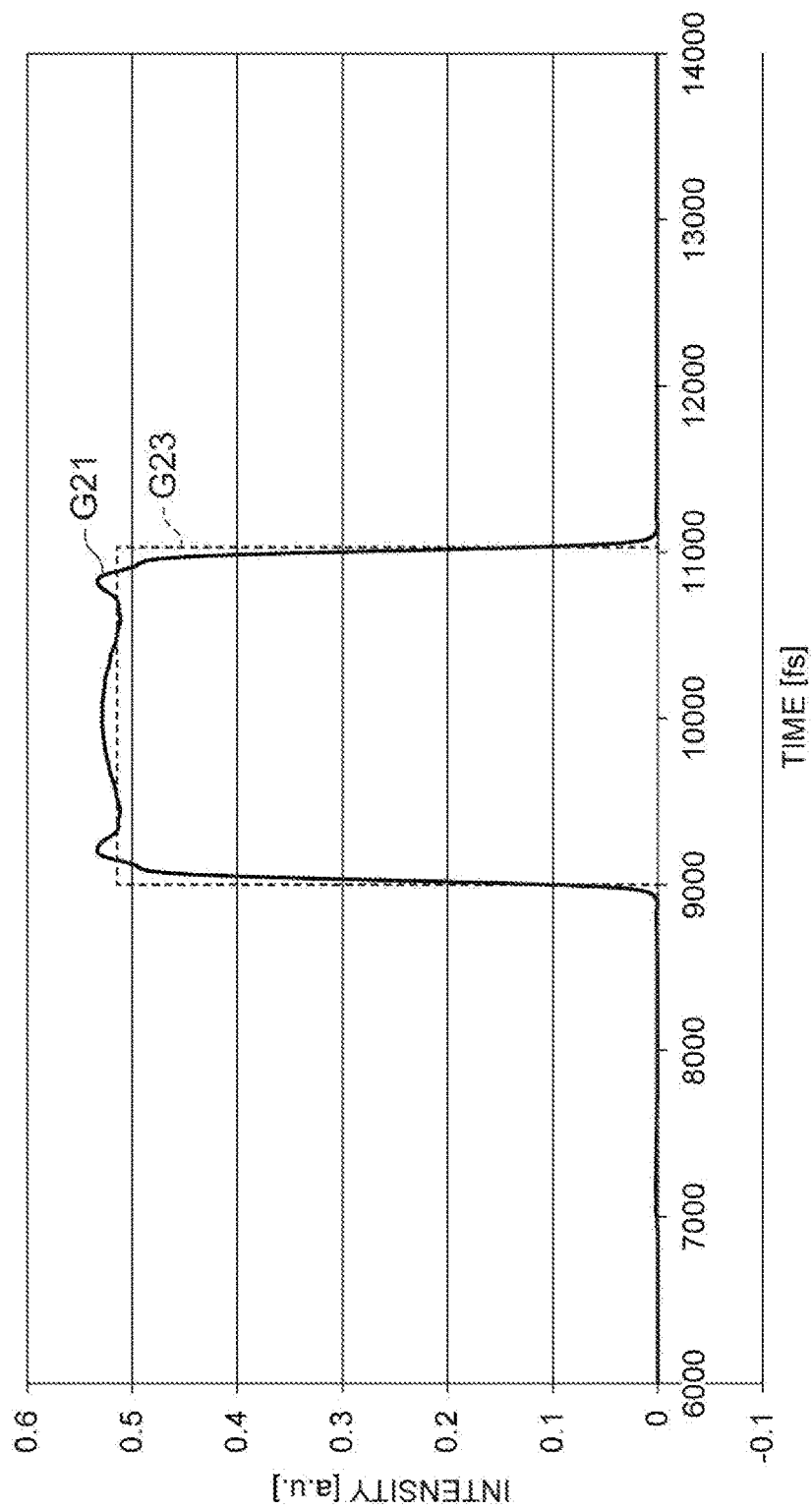
FIG. 10 is a diagram illustrating a temporal waveform of output light and a desired waveform.
Figure 11:
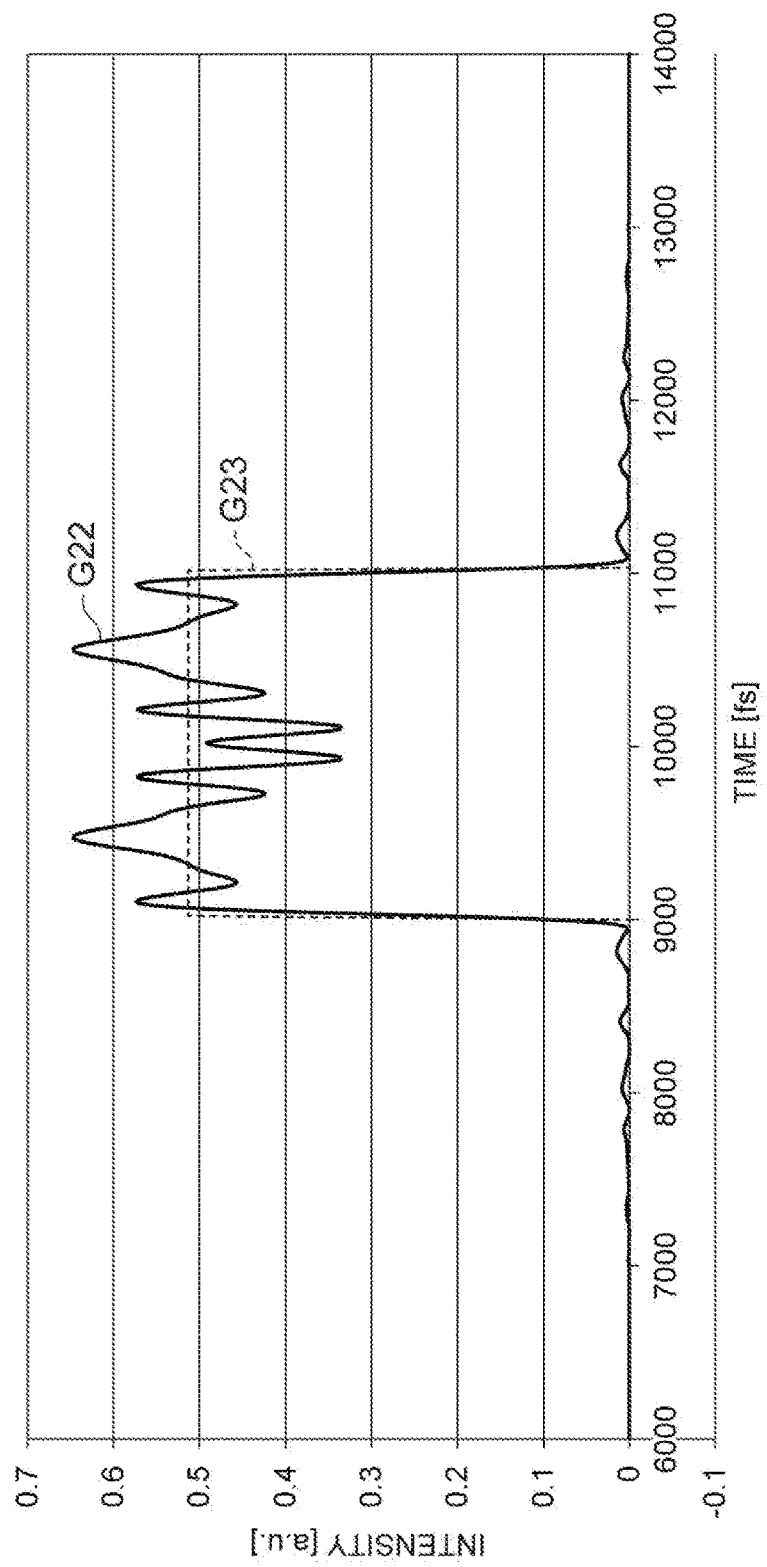
FIG. 11 is a diagram illustrating a temporal waveform of output light and a desired waveform.

In the plots P1 and P2, because intensity modulation is not performed, both intensity losses are 0%. When standard deviations are compared with each other, waveform accuracy in the case (plot P1) of introducing the coefficient $\alpha$ is improved by about 1.7 times as compared with the case (plot P2) of not introducing the coefficient $\alpha$ (arrow A3 in the drawing). Further, FIG. 10 illustrates a temporal waveform G21 of the output light Ld corresponding to the plot P1 and a desired waveform G23 given as the initial target waveform $Target_0(t)$, and FIG. 11 illustrates a temporal waveform G22 of the output light Ld corresponding to the plot P2 and the desired waveform G23 given as the initial target waveform $Target_0(t)$. From these results, it can be seen that smoothness of a top portion of the waveform in particular is greatly improved by introducing the coefficient $\alpha$.

Figure 12:
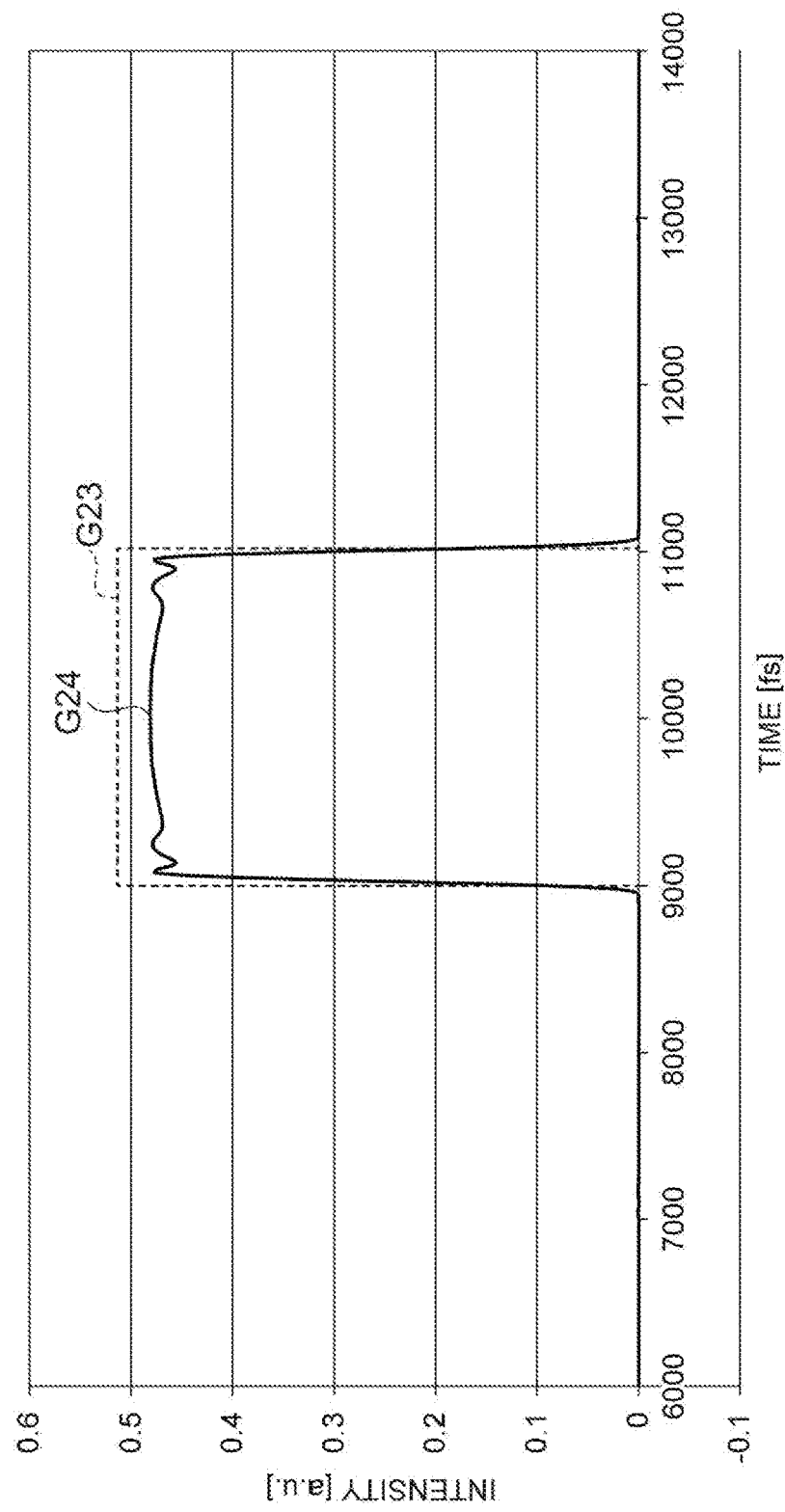
FIG. 12 is a diagram illustrating a temporal waveform of output light and a desired waveform.
Figure 13:
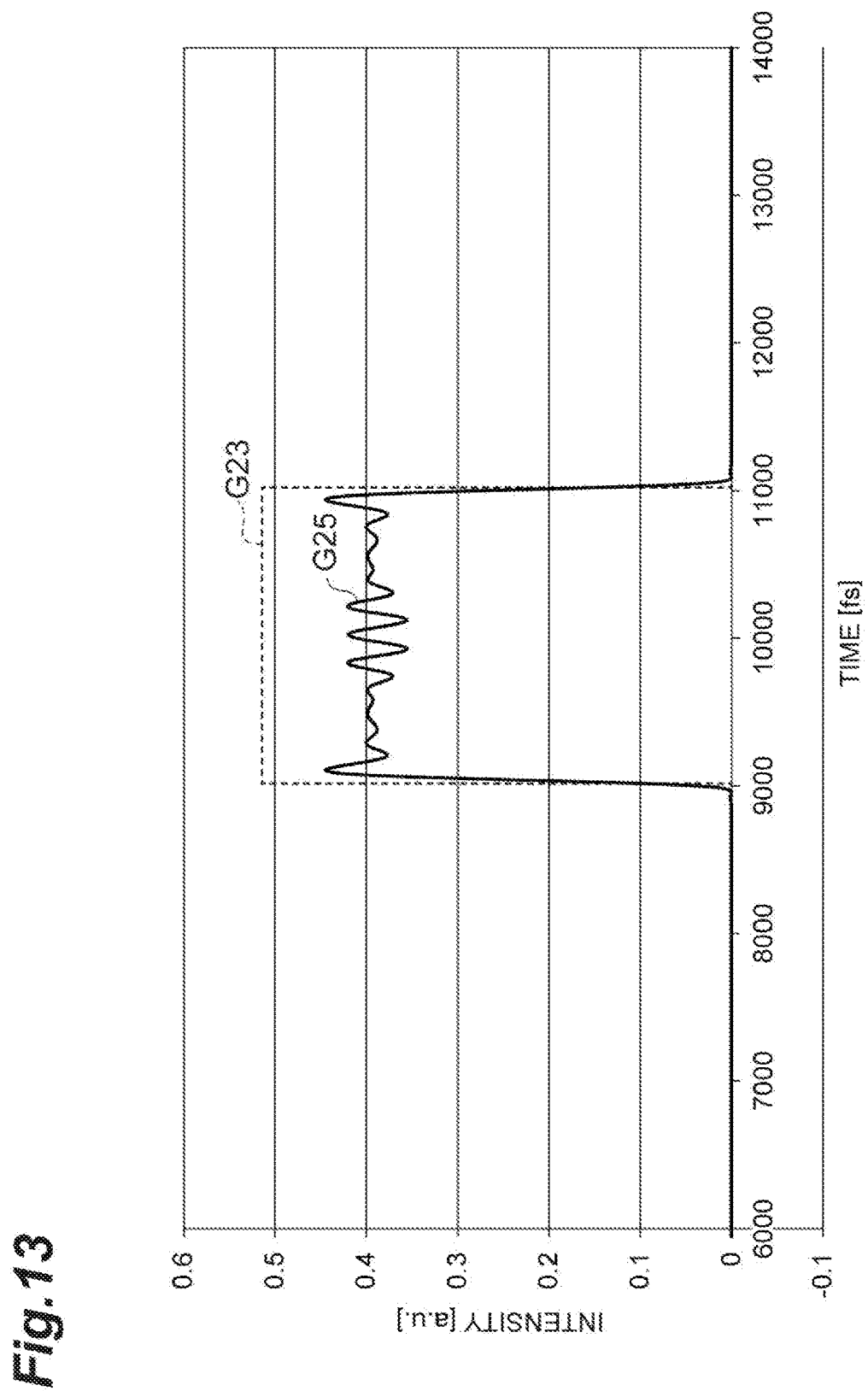
FIG. 13 is a diagram illustrating a temporal waveform of output light and a desired waveform.

Further, when the plots P3 and P4 are compared with each other, it can be seen that it is possible to reduce the intensity loss to about ⅓ while substantially maintaining the waveform accuracy by introducing the coefficient α (plot P3), as compared with the case (plot P4) of not introducing the coefficient α (arrow A4 in the drawing). Further, FIG. 12 illustrates a temporal waveform G24 of the output light Ld corresponding to the plot P3 and the desired waveform G23 given as the initial target waveform $Target_0(t)$, and FIG. 13 illustrates a temporal waveform G25 of the output light Ld corresponding to the plot P4 and the desired waveform G23 given as the initial target waveform $Target_0(t)$. When these waveforms are compared with each other, it can be seen that smoothness of a top portion of the waveform in particular is greatly improved by introducing the coefficient α.

Figure 14:
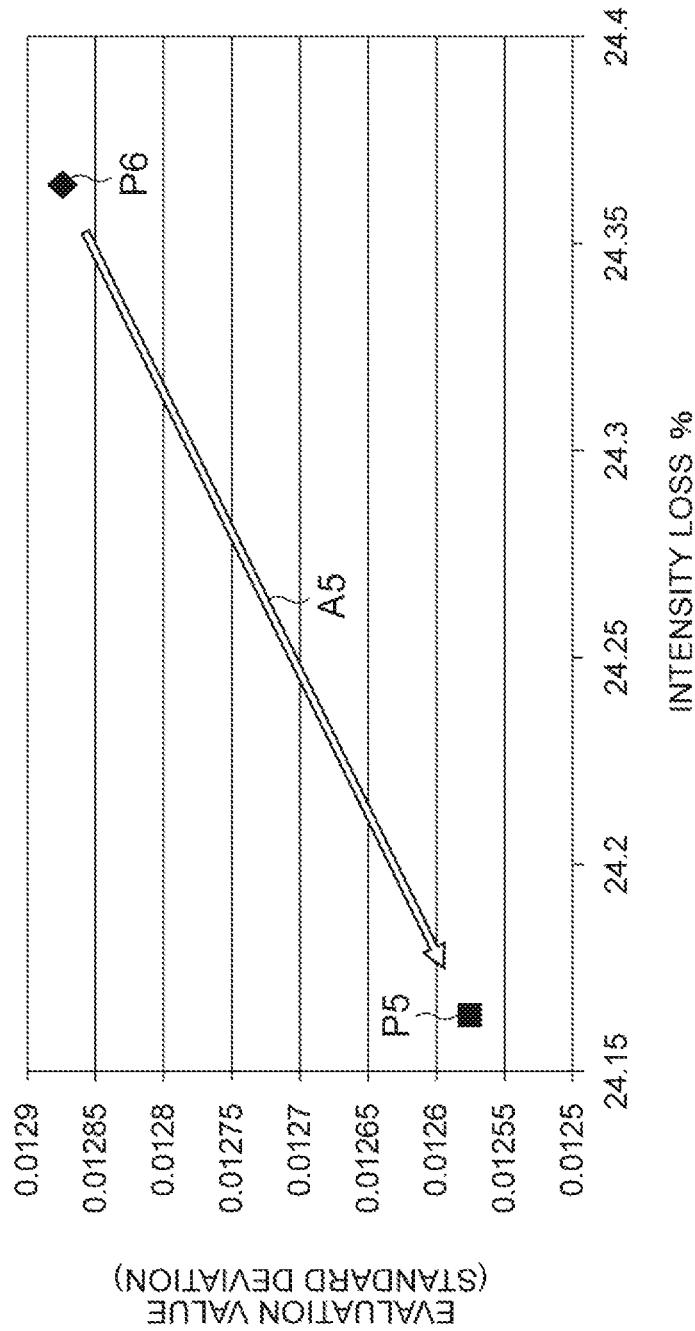
FIG. 14 is a graph illustrating intensity loss and waveform accuracy with waveform control.

FIG. 14 is another graph illustrating the intensity loss and the waveform accuracy with the waveform control.

A plot P5 in the drawing shows the case in which modulation based on the phase spectrum function $\Psi_{IFTA}(\omega)$ obtained without introducing the coefficient α and the intensity spectrum function $A_{IFTA}(\omega)$ obtained by introducing the coefficient α is performed. Further, a plot P6 shows the case in which modulation based on both the phase spectrum function $\Psi_{IFTA}(\omega)$ and the intensity spectrum function $A_{IFTA}(\omega)$ obtained without introducing the coefficient α is performed.

When these are compared with each other, as compared with the case (plot P6) in which the coefficient α is not introduced, the intensity loss becomes about 0.99 times and a loss improvement is confirmed, in the case (plot P5) in which the coefficient α is introduced in only the calculation of the intensity spectrum function $A_{IFTA}(\omega)$ (arrow A5 in the drawing). Further, the waveform accuracy becomes about 1.02 times in the plot P5 as compared with the plot P6 and an improvement in the waveform accuracy is confirmed.

The modulation pattern calculation apparatus, the light control apparatus, the modulation pattern calculation method, and the modulation pattern calculation program according to one aspect of the present invention are not limited to the embodiments and the modifications described above, and various other modifications are enabled.

For example, in the above embodiment, the case in which the coefficient α is applied to IFTA-Fienup (second comparative example) has been exemplified, however, the present invention is not limited thereto, and for example, the coefficient α may be applied to the normal iterative Fourier method according to the first comparative example. Further, in the above embodiment, the coefficient α in which the difference between the waveform function after the Fourier transform and the result of multiplying the function representing the desired waveform by the coefficient α decreases is calculated by minimizing the standard deviation σ. However, the calculation method of the coefficient α is not limited thereto, and for example, a total sum (that is, a time integral value) of difference values between the waveform function after the Fourier transform and the result of multiplying the function representing the desired waveform by the coefficient α may be minimized.

The modulation pattern calculation apparatus according to the above embodiment is an apparatus for calculating a modulation pattern presented on a spatial light modulator for modulating at least one of an intensity spectrum and a phase spectrum of input light to bring a temporal intensity waveform of light close to a desired waveform, and the apparatus includes an iterative Fourier transform unit for performing a Fourier transform on a waveform function in a frequency domain including an intensity spectrum function and a phase spectrum function, performing a first replacement of a temporal intensity waveform function based on the desired waveform in a time domain after the Fourier transform and then performing an inverse Fourier transform, and performing a second replacement to constrain one spectrum function of the intensity spectrum function and the phase spectrum function in the frequency domain after the inverse Fourier transform, and a modulation pattern calculation unit for calculating the modulation pattern on the basis of the other spectrum function output from the iterative Fourier transform unit. The iterative Fourier transform unit performs the first replacement using a result of multiplying a function representing the desired waveform by a coefficient. The coefficient has a value in which a difference between the function after the multiplication and the temporal intensity waveform function after the Fourier transform is smaller than a difference before the multiplication of the coefficient.

Further, the modulation pattern calculation method according to the above embodiment is a method for calculating a modulation pattern presented on a spatial light modulator for modulating at least one of an intensity spectrum and a phase spectrum of input light to bring a temporal intensity waveform of light close to a desired waveform, and the method includes an iterative Fourier transform step of performing a Fourier transform on a waveform function in a frequency domain including an intensity spectrum function and a phase spectrum function, performing a first replacement of a temporal intensity waveform function based on the desired waveform in a time domain after the Fourier transform and then performing an inverse Fourier transform, and performing a second replacement to constrain one spectrum function of the intensity spectrum function and the phase spectrum function in the frequency domain after the inverse Fourier transform, and a modulation pattern calculation step of calculating the modulation pattern on the basis of the other spectrum function output in the iterative Fourier transform step. In the iterative Fourier transform step, the first replacement is performed using a result of multiplying a function representing the desired waveform by a coefficient. The coefficient has a value in which a difference between the function after the multiplication and the temporal intensity waveform function after the Fourier transform is smaller than a difference before the multiplication of the coefficient.

Further, the modulation pattern calculation program according to the above embodiment operates a computer, in an apparatus for calculating a modulation pattern presented on a spatial light modulator for modulating at least one of an intensity spectrum and a phase spectrum of input light to bring a temporal intensity waveform of light close to a desired waveform, as an iterative Fourier transform unit for performing a Fourier transform on a waveform function in a frequency domain including an intensity spectrum function and a phase spectrum function, performing a first replacement of a temporal intensity waveform function based on the desired waveform in a time domain after the Fourier transform and then performing an inverse Fourier transform, and performing a second replacement to constrain one spectrum function of the intensity spectrum function and the phase spectrum function in the frequency domain after the inverse Fourier transform, and a modulation pattern calculation unit for calculating the modulation pattern on the basis of the other spectrum function output from the iterative Fourier transform unit. The iterative Fourier transform unit operates such that the first replacement is performed using a result of multiplying a function representing the desired waveform by a coefficient. The coefficient has a value in which a difference between the function after the multiplication and the temporal intensity waveform function after the Fourier transform is smaller than a difference before the multiplication of the coefficient.

In the above apparatus, the method, and the program, in the iterative Fourier transform step, the iterative Fourier transform unit may repeatedly perform the Fourier transform, the first replacement, the inverse Fourier transform, and the second replacement, and in the modulation pattern calculation step, the modulation pattern calculation unit may calculate the modulation pattern on the basis of the other spectrum function obtained after the repetition. As such, the iterative Fourier transform is repeatedly performed, so that the intensity spectrum or the phase spectrum to bring the temporal intensity waveform of the light close to the desired waveform can be calculated more accurately.

In the above apparatus, the method, and the program, the coefficient may have the value in which a standard deviation of the function after the multiplication with respect to the temporal intensity waveform function after the Fourier transform is minimized. As a result, a difference between the function after the multiplication of the coefficient and the temporal intensity waveform function after the Fourier transform can be minimized, and the solution can be more effectively prevented from being led to the local solution.

Further, the light control apparatus according to the above embodiment includes the modulation pattern calculation apparatus described above, a light source for outputting the input light, a dispersive element for spectrally dispersing the input light, a spatial light modulator for modulating at least one of an intensity spectrum and a phase spectrum of the input light after the dispersion and outputting modulated light, and an optical system for focusing the modulated light. The spatial light modulator presents the modulation pattern calculated by the above modulation pattern calculation apparatus.

According to this apparatus, the modulation pattern calculation apparatus described above is included, so that the solution can be prevented from being led to the local solution during an iterative Fourier operation, and the intensity spectrum or the phase spectrum to bring the temporal waveform of the light close to the desired waveform can be accurately calculated.

INDUSTRIAL APPLICABILITY

The present invention can be used as a modulation pattern calculation apparatus, a light control apparatus, a modulation pattern calculation method, a modulation pattern calculation program, and a computer readable medium capable of preventing a solution from being led to a local solution during an iterative Fourier operation, and accurately calculating an intensity spectrum or a phase spectrum to bring a temporal waveform of light close to a desired waveform.

REFERENCE SIGNS LIST

1A—light control apparatus, 2—light source, 10—optical system, 12—dispersive element, 14—curved mirror, 16—spatial light modulator (SLM), 17—modulation plane, 20—modulation pattern calculation apparatus, 21—arbitrary waveform input unit, 22—phase spectrum design unit, 22a—iterative Fourier transform unit, 23—intensity spectrum design unit, 23a—iterative Fourier transform unit, 24—modulation pattern calculation unit, La—input light, Ld—output light.

The invention claimed is:

1. A modulation pattern calculation apparatus for calculating a modulation pattern presented on a spatial light modulator configured to modulate at least one of an intensity spectrum and a phase spectrum of input light to bring a temporal intensity waveform of light close to a desired waveform, the apparatus comprising:
an iterative Fourier transform unit configured to perform a Fourier transform on a waveform function in a frequency domain including an intensity spectrum function and a phase spectrum function, perform a first replacement of a temporal intensity waveform function based on the desired waveform in a time domain after the Fourier transform and then performing an inverse Fourier transform, and perform a second replacement to constrain one spectrum function of the intensity spectrum function and the phase spectrum function in the frequency domain after the inverse Fourier transform; and
a modulation pattern calculation unit configured to calculate the modulation pattern on the basis of the other spectrum function output from the iterative Fourier transform unit, wherein
the iterative Fourier transform unit is configured to perform the first replacement using a result of multiplying a function representing the desired waveform by a coefficient, and
the coefficient has a value in which a difference between the function after the multiplication and the temporal intensity waveform function after the Fourier transform is smaller than a difference before the multiplication of the coefficient.

2. The modulation pattern calculation apparatus according to claim 1, wherein the iterative Fourier transform unit is configured to repeatedly perform the Fourier transform, the first replacement, the inverse Fourier transform, and the second replacement, and
the modulation pattern calculation unit is configured to calculate the modulation pattern on the basis of the other spectrum function obtained after the repetition.

3. The modulation pattern calculation apparatus according to claim 1, wherein the coefficient has the value in which a standard deviation of the function after the multiplication with respect to the temporal intensity waveform function after the Fourier transform is minimized.

4. A light control apparatus comprising:
the modulation pattern calculation apparatus according to claim 1;
a light source configured to output the input light;
a dispersive element configured to spectrally disperse the input light;
the spatial light modulator configured to modulate at least one of an intensity spectrum and a phase spectrum of the input light after the dispersion and output modulated light; and
an optical system configured to focus the modulated light, wherein
the spatial light modulator is configured to present the modulation pattern calculated by the modulation pattern calculation apparatus.

5. A modulation pattern calculation method for calculating a modulation pattern presented on a spatial light modulator configured to modulate at least one of an intensity spectrum and a phase spectrum of input light to bring a temporal intensity waveform of light close to a desired waveform, the method comprising:

a step of performing a Fourier transform on a waveform function in a frequency domain including an intensity spectrum function and a phase spectrum function;

a step of performing a first replacement of a temporal intensity waveform function based on the desired waveform in a time domain after the Fourier transform and then performing an inverse Fourier transform;

a step of performing a second replacement to constrain one spectrum function of the intensity spectrum function and the phase spectrum function in the frequency domain after the inverse Fourier transform; and a step of calculating the modulation pattern on the basis of the other spectrum function output in the step of performing the second replacement, wherein in the step of performing the inverse Fourier transform, the first replacement is performed using a result of multiplying a function representing the desired waveform by a coefficient, and the coefficient has a value in which a difference between the function after the multiplication and the temporal intensity waveform function after the Fourier transform is smaller than a difference before the multiplication of the coefficient.

6. The modulation pattern calculation method according to claim 5, wherein the step of performing the Fourier transform, the step of performing the inverse Fourier transform, and the step of performing the second replacement are repeatedly performed, and in the step of calculating the modulation pattern, the modulation pattern is calculated on the basis of the other spectrum function obtained after the repetition.

7. The modulation pattern calculation method according to claim 5, wherein the coefficient has the value in which a standard deviation of the function after the multiplication with respect to the temporal intensity waveform function after the Fourier transform is minimized.

8. A modulation pattern calculation program for causing a computer to calculate a modulation pattern presented on a spatial light modulator configured to modulate at least one of an intensity spectrum and a phase spectrum of input light to bring a temporal intensity waveform of light close to a desired waveform, the program causing the computer to execute:

a step of performing a Fourier transform on a waveform function in a frequency domain including an intensity spectrum function and a phase spectrum function;

a step of performing a first replacement of a temporal intensity waveform function based on the desired waveform in a time domain after the Fourier transform and then performing an inverse Fourier transform;

a step of performing a second replacement to constrain one spectrum function of the intensity spectrum function and the phase spectrum function in the frequency domain after the inverse Fourier transform; and a step of calculating the modulation pattern on the basis of the other spectrum function output in the step of performing the second replacement, wherein in the step of performing the inverse Fourier transform, the first replacement is performed using a result of multiplying a function representing the desired waveform by a coefficient, and the coefficient has a value in which a difference between the function after the multiplication and the temporal intensity waveform function after the Fourier transform is smaller than a difference before the multiplication of the coefficient.

9. A non-transitory computer readable medium having the modulation pattern calculation program according to claim 8 stored therein.

* * * * *